(12) United States Patent
Schumann (10) Patent No.: US 12,482,278 B2
(45) Date of Patent: Nov. 25, 2025

(54) METHOD AND APPARATUS FOR DETERMINING AND CLASSIFYING AT LEAST ONE OBJECT IN A SENSING AREA OF A SENSOR

(71) Applicant: CARIAD SE, Wolfsburg (DE)

(72) Inventor: Martin Schumann, Berlin (DE)

(73) Assignee: CARIAD SE, Wolfsburg (DE)

( * ) Notice: Subject to any disclaimer, the term of this patent is extended or adjusted under 35 U.S.C. 154(b) by 487 days.

(21) Appl. No.: 17/915,932

(22) PCT Filed: Apr. 1, 2021

(86) PCT No.: PCT/EP2021/058667
§ 371 (c)(1),
(2) Date: Sep. 29, 2022

(87) PCT Pub. No.: WO2021/198446
PCT Pub. Date: Oct. 7, 2021

(65) Prior Publication Data
US 2023/0148091 A1 May 11, 2023

(30) Foreign Application Priority Data
Apr. 3, 2020 (DE) ...................... 10 2020 109 364.0

(51) Int. Cl.
*G06V 20/64* (2022.01)
*G06V 10/764* (2022.01)
(Continued)

(52) U.S. Cl.
CPC ............ *G06V 20/64* (2022.01); *G06V 10/764* (2022.01); *G06V 10/82* (2022.01); *G06V 20/56* (2022.01); *G06V 20/58* (2022.01)

(58) Field of Classification Search
CPC ...... G06V 20/64; G06V 10/764; G06V 10/82; G06V 20/56; G06V 20/58; G06F 18/24133
See application file for complete search history.

(56) References Cited

U.S. PATENT DOCUMENTS

| 11,577,722 B1 * | 2/2023 | Packer ................. G05D 1/0088 |
| 12,128,887 B1 * | 10/2024 | Kiiski ................... G06V 20/58 |
| 2018/0173971 A1 | 6/2018 | Jia et al. |

FOREIGN PATENT DOCUMENTS

| DE | 102007012955 A1 | 12/2007 |
| EP | 0820040 A2 | 1/1998 |

(Continued)

OTHER PUBLICATIONS

Michaelis C, Ustyuzhaninov I, Bethge M, Ecker AS. One-shot instance segmentation. arXiv preprint arXiv:1811.11507. Nov. 28, 2018.*

(Continued)

*Primary Examiner* — Fayyaz Alam
(74) *Attorney, Agent, or Firm* — Seed Intellectual Property Law Group LLP (57) ABSTRACT

In a method for determining and classifying at least one object in a sensing area of a sensor, a two- or three-dimensional image of the sensing area is captured by means of the sensor. Sensor data corresponding to the image is generated. The object in the image is determined by means of the sensor data and by means of first template data of at least one first template object using a neural network. The neural network has been trained using the first template data. The first template data corresponds to an image of the first template object. At least one first object class is associated with the first template object. The object is classified by the neural network determining whether the object belongs to the first object class or not.

12 Claims, 7 Drawing Sheets

(51) Int. Cl.
    *G06V 10/82*  (2022.01)
    *G06V 20/56*  (2022.01)
    *G06V 20/58*  (2022.01)

(56) References Cited

FOREIGN PATENT DOCUMENTS

| EP | 2416115 A1 | 2/2012 |
|---|---|---|
| WO | WO 2018023143 A1 | 2/2018 |

OTHER PUBLICATIONS

Bonde et al., "TemplateNet for Depth-Based Object Instance Regcognition," arXiv:1511.03244v1 [cs.CV], Nov. 10, 2015, 10 pages.
Lin et al., "Microsoft COCO: Common Objexts in Context," arXiv:1405.0312v3 [cs.CV], Feb. 21, 2015, 15 pages.
Michaelis et al., "One-Shot Instance Segmentation," arXiv:1811.11507v2 [cs.CV], May 28, 2019, 20 pages.

* cited by examiner

METHOD AND APPARATUS FOR DETERMINING AND CLASSIFYING AT LEAST ONE OBJECT IN A SENSING AREA OF A SENSOR

BACKGROUND

Technical Field

Embodiments of the invention relate to a method for determining and classifying at least one object in a sensing area of a sensor. Embodiments of the invention further relate to an apparatus for determining and classifying at least one object in a sensing area of a sensor.

Description of the Related Art

In the field of autonomous driving and in driving assistance systems, sensor data of images captured by a sensor fixedly mounted on a vehicle, for example a camera, a lidar sensor, or a radar sensor, are to be processed in order to determine and classify an object in a sensing area of the sensor. This is done, in particular, by using a machine learning method, in particular, a neural network.

In order to be able to classify the object using the machine learning method, the machine learning method must have been trained using a training data set. Such a training data set usually includes a plurality of images of other objects and of the object class of the respective object. Common machine learning methods can only decide whether the object to be classified belongs to an object class that is known from the training data set.

A method for segmenting an image is known from the document by Michaelis et al, *One-Shot Instance Segmentation*, ar-Xiv:1811.11507v2, which is to say, for generating regions of the image that are related in content. In the method, the image is segmented with the help of a template using a neural network.

A method for recognizing objects in images is further known from the document by Bonde et al, *TemplateNet for Depth-Based Object Instance Recognition*, arXiv: 1511.03244v1. The method uses a neural network with an intermediate template layer.

BRIEF SUMMARY

Some embodiments provide a method and an apparatus for determining and classifying at least one object in a sensing area of a sensor, which allow for a fast and reliable classification of the object.

In a method, a two- or three-dimensional image of the sensing area is captured by means of the sensor. Sensor data corresponding to the image are generated. Using the sensor data and using first template data of at least a first template object, the object is determined in the image using a neural network. The neural network is trained using the first template data. The first template data corresponds to an image of the first template object. At least one first object class is associated with the first template object. The object is classified by the neural network determining whether the object belongs to the first object class or not.

In the present application, three-dimensional images are understood to mean, in particular, point clouds or elevations maps.

Initially, the neural network is trained using the first template data. For this purpose, at least the first template data are fed as input to the neural network. To determine and classify the object in the sensing area, the sensor data are fed as input to the trained neural network. In addition, the first template data is fed as input to the neural network as a reference, a so-called template, for the first object class.

On the basis of the input data, the neural network decides whether the object to be classified belongs to the same object class as the first template object or not. In so doing, this classifies the object to be classified. The classification by means of the first template data is much faster and more reliable than with known neural networks since the degrees of freedom of the neural network can be reduced by the use of the first template data.

The training of the neural network can be repeated for a multitude of first template data. The multitude of first template data corresponds to images of first template objects, which are assigned to different object classes.

In an embodiment, the sensor data and second template data of a second template object are used to determine the object in the image using a neural network. The second template data correspond to an image of the second template object to which at least one second object class is assigned. The object is classified by the neural network determining whether the object is to be assigned to the second object class or is not to be assigned to the second object class. In this embodiment, the neural network has been trained by means of the first template data to determine whether or not the object to be classified is to be assigned to the second object class based on second template data that are different from the first template data. As a consequence, the neural network is able to determine, based on any template data which is fed as input to the neural network as a template, whether the object to be classified belongs to the same object class as the template object corresponding to the respective template data. In this way, it is possible for the neural network to determine, in particular, whether the object belongs to an object class that is not known to the neural network from training. In other words, the neural network may use the second template data to identify an object that is not known to the neural network from training. This immensely reduces the effort required to train the neural network. In particular, the neural network is not required to be trained again if further object classes were to be identified. It is sufficient to provide additional second template data.

The classification of the object using the trained neural network can be performed, in particular, for a plurality of first and/or second template data. The plurality of first and/or second template data thereby corresponds in each case to images of first and/or second template objects, which are assigned in each case to different object classes. This means that more than one template is fed as input to the neural network together with the sensor data as a reference in order to classify the object. For example, to determine and classify the object, the sensor data and a subset of a plurality of first and/or second template data corresponding, respectively, to an image of a first or alternatively of a second template object, may be fed as input to the trained neural network. This step is repeated until all subsets of the plurality of first and/or second template data corresponding, respectively, to images of the first or alternatively of the second template objects, have been fed as input to the neural network. In particular, however, the plurality of first and/or second template data may be fed as input to the neural network simultaneously with the sensor data. In this way, a decision can be made in one pass as to whether or not the object to be classified can be assigned to one of the various object classes.

In another embodiment, the neural network has been trained using the first template data and a plurality of training sensor data. The training sensor data are images of further objects corresponding to at least the first object class. Alternatively, or additionally, the training sensor data are images of further objects not associated with the first object class. In a further embodiment, the training is performed by changing parameters of the neural network until each input of the training sensor data and the first template data into the neural network results in the expected output by the neural network, which is to say, the correct classification of the training sensor data. Alternatively, a lower threshold, for example, 99% of inputs of training sensor data, can be set to result in an expected output by the neural network to determine whether training is complete. Algorithms for changing the parameters of the neural network are known, for example, back-propagation. In particular, the training may consist of supervised learning or unsupervised learning.

It may be advantageous if exactly one of the object classes is assigned to each template object. In this way, at most one object class is assigned to the object to be classified. Thus, an unambiguous classification of the object is guaranteed. Alternatively, more than one object class is assigned to each template object. These object classes are, in particular, related to each other. In particular, the object classes are ordered hierarchically, for example, from the most general object class to the most specific object class. For example, if the template object is a vehicle of a particular type and series, the object classes assigned to this template object can be a vehicle, the particular type, and the particular series.

It may be advantageous if no object class is assigned to more than one template object. If more than one object class is assigned to one or more template objects, it may be advantageous if no combination of object classes is assigned to more than one template object. In this manner, only one single template object exists for each object class or combination of object classes. This allows an unambiguous classification of the object.

It may be advantageous if, by means of the sensor data and by means of the first template data or the second template data, an image area is determined using the neural network, which is a sub-area of the image and comprises an image of the object. In so doing, the image is segmented, which is to say content-related image areas are further processed as the sub-area. This simplifies the subsequent classification of the object, since only image data associated with the object are used for this purpose. In this manner, the classification can be performed more easily and more reliably.

In another embodiment, the sensor is a camera, in particular, a monocular camera, or a lidar sensor, or a radar sensor. A monocular camera is a camera that has only a single lens and can only sense non-stereoscopic images. An elevation map or a point cloud of the sensing area, which is a three-dimensional image of the sensing area, is captured by means of the lidar sensor or the radar sensor. The sensor could also include multiple cameras.

In a further embodiment, the vehicle may include multiple sensors, such as one or more cameras and/or one or more lidar sensors and/or one or more radar sensors.

In a further embodiment, the sensor is a sensor of a vehicle, in particular, a road vehicle. In this embodiment, the method is used to sense and classify the object in the sensing area, which is, for example, in front of or behind the vehicle, by means of the sensor of the vehicle. The robust classification of the object by the method and the possibility to implement new object classes without retraining of the neural network are advantageous for use in road traffic.

The object class associated with the object to be classified may be used as an input for a driving assistance system or a control unit for autonomous control of the vehicle. For example, the object class can be used to decide whether the vehicle can safely ignore the object, whether the vehicle must drive around the object, or whether the vehicle must initiate a braking process. Alternatively, or additionally, the driving assistance system can issue an indication of the object or a warning if the object poses a danger to the vehicle.

In a further embodiment, the position of the object relative to the vehicle is determined by means of the image data and the object class assigned to the object to be classified. For this purpose, for example, the height, width and/or length of the object are determined by means of the object class. By means of a comparison of the dimensions of the object with the size of the image of the object, the distance between the object and the vehicle can be determined. In this embodiment, it is thus possible to carry out the method in a particularly simple manner and, in particular, using only a monocular camera, and to determine the size of the object in the sensing area in front of or behind the vehicle.

Some embodiments further relate to an apparatus for determining and classifying at least one object in a sensing area of a sensor. The sensor is designed to sense a two- or three-dimensional image of the sensing area. The apparatus further comprises an image processing and evaluation unit, which is designed to generate sensor data corresponding to the image, and to determine the object in the image by means of the sensor data and by means of first template data of a first template object using a neural network. The neural network has been trained using the first template data. The first template data corresponds to an image of the first template object. At least a first object class is associated with the first template object. The object is classified by the neural network determining whether the object is to be associated with the first object class or not associated with the first object class.

The apparatus may have the same advantages as the method and can be further embodied in the same way, in particular, with the features of the systems and methods described herein.

In an embodiment, the sensor is a camera, in particular, a monocular camera, and/or a lidar sensor and/or a radar sensor. Monocular cameras are less expensive than comparable stereo cameras. In addition, monocular cameras do not require complex calibration. By using a monocular camera, the apparatus can, in particular, therefore be manufactured at a lower cost and has lesser requirements for maintenance.

In a further embodiment, the sensor is fixedly connected to a vehicle, in particular, a road vehicle. This means that, in particular, only a single calibration of the sensor is required.

BRIEF DESCRIPTION OF THE SEVERAL
VIEWS OF THE DRAWINGS

Further features and advantages result from the following description, which details an embodiment in conjunction with the accompanying figures.

DETAILED DESCRIPTION

Figure 1:
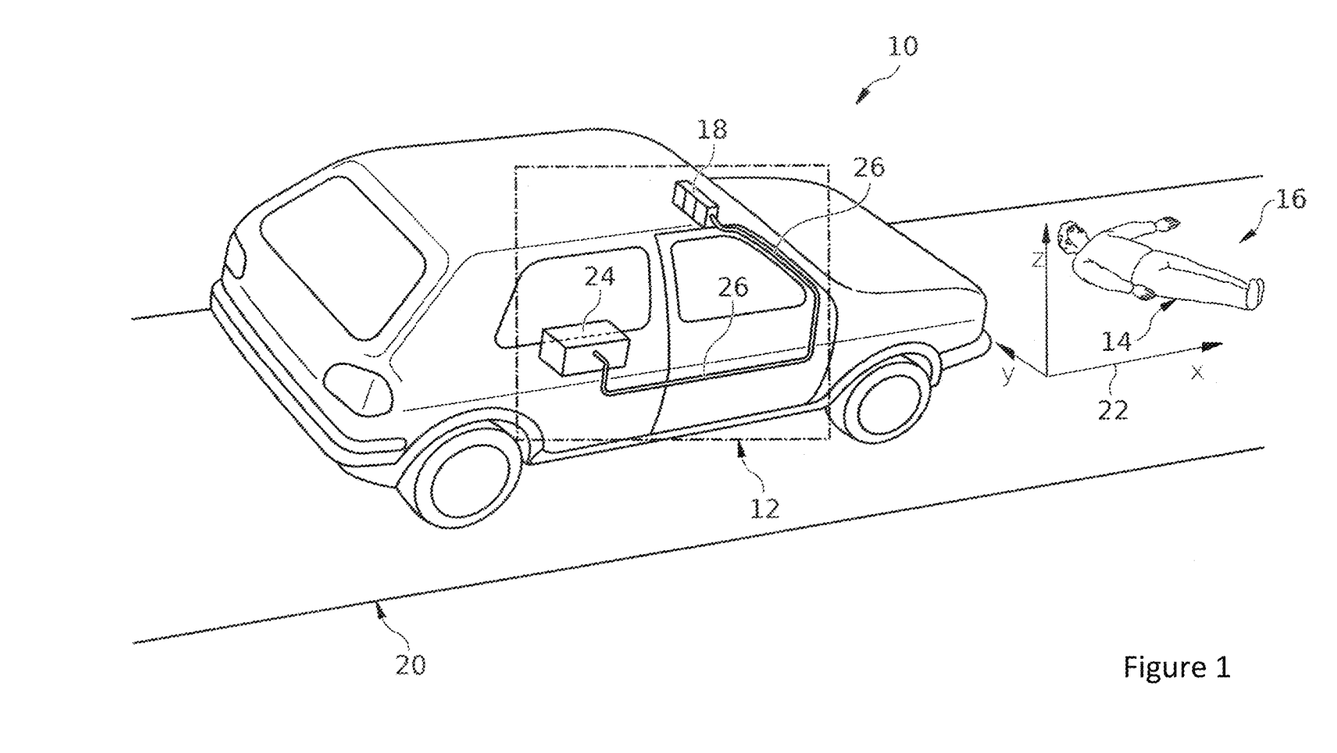
FIG. 1 shows a vehicle with an apparatus for determining and classifying an object in a sensing area in front of the vehicle by means of a sensor of the vehicle.

FIG. 1 shows a vehicle 10 with an apparatus 12 for determining and classifying an object 14 in a sensing area 16 in front of the vehicle 10 by means of a sensor 18 of the vehicle 10. In the embodiment example shown, the vehicle 10 is designed as a passenger vehicle that is located on a road surface 20. In the embodiment example shown in FIG. 1, the object 14 to be determined and to be classified is a person in the road surface 20. Alternatively, the object 14 to be classified may be, for example, another vehicle, a traffic sign, or a lane marking of the road surface 20 in the sensing area 16 in front of the vehicle 10. Alternatively, or additionally, the sensing area 16 may be behind the vehicle 10 and/or on the sides of the vehicle 10.

FIG. 1 further shows a coordinate cross 22 of a stationary coordinate system. A first coordinate axis X runs parallel to the road surface 20 and in the direction of travel of the vehicle 10. A second coordinate axis Y also runs parallel to the road surface 20, and is perpendicular to the first coordinate axis X. The second coordinate axis Y runs transverse to the direction of travel of the vehicle 10. A third coordinate axis Z points upward and is perpendicular to the plane spanned by the first coordinate axis X and the second coordinate axis Y.

The apparatus 12 comprises the sensor 18, which is fixedly connected to the vehicle 10. In the embodiment shown, the sensor 18 is configured as a camera. Alternatively, the sensor 18 may be a radar or lidar sensor. Alternatively, the apparatus 12 may comprise a plurality of sensors 18, such as one or more cameras and/or one or more lidar sensors and/or one or more radar sensors. The camera 18 is oriented in the direction of travel of the vehicle 10, or in the direction of the first coordinate axis X, such that it can sense a sensing area 16 on the road surface 20 in front of the vehicle 10. The apparatus 12 further comprises an image processing and evaluation unit 24 that is connected to the camera 18 via a cable 26. Alternatively, the image processing and evaluation unit 24 may be located outside the vehicle 10, for example in an external server. The image processing and evaluation unit 24 comprises a neural network 100 (see FIG. 3) and is designed to receive image data generated by the camera 18 and to further process it for classifying the object 14. The neural network 100 is described in further detail below with reference to FIGS. 3 to 5.

Figure 2:
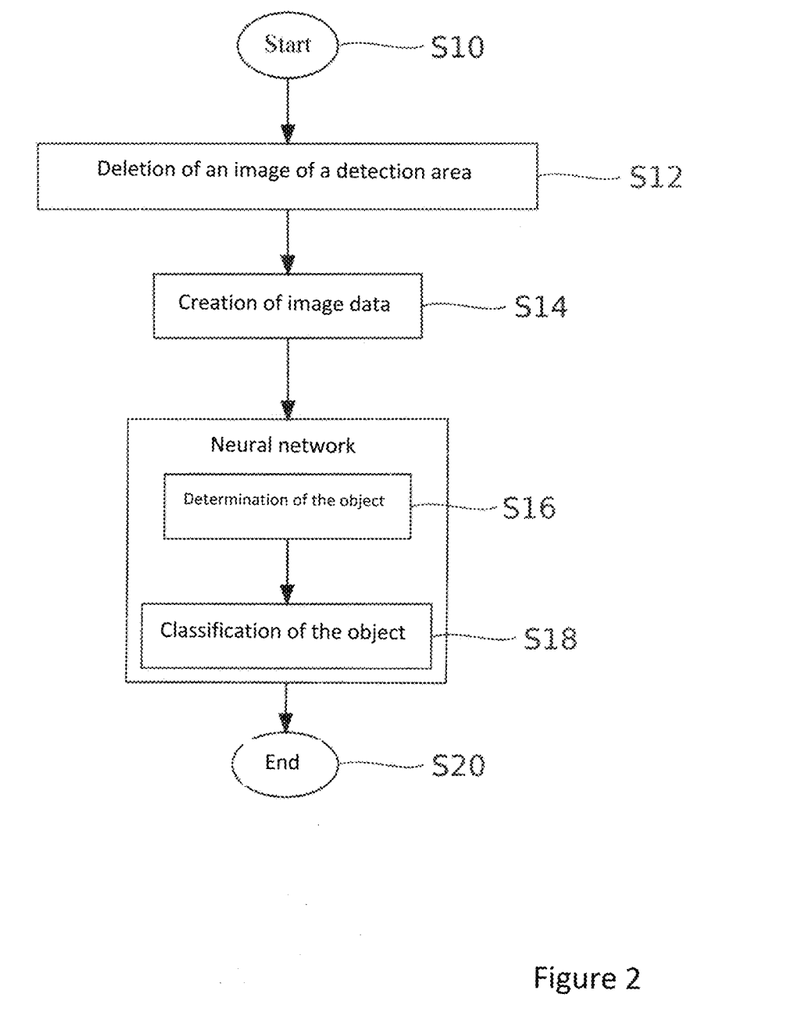
FIG. 2 shows a flowchart of a process for determining and classifying the object in the sensing area.

FIG. 2 shows a flowchart of a process for determining and classifying the object 14 in the sensing area 16.

The process is started in step S10. Then, in step S12, a two-dimensional or three-dimensional image of the sensing area 16 is captured by the sensor 18. By way of example, an elevation map of the sensing area 16 or a point cloud of the sensing area 16 is captured as a three-dimensional image. In the subsequent step S14, image data corresponding to the image is generated. This image data is transmitted from the sensor 18 to the image processing and evaluation unit 24 and fed to the neural network 100 as input, which is stored, for example, as a program in the image processing and evaluation unit 24. Alternatively, the image processing and evaluation unit 24 transmits the image data to a remote server or a decentralized network of servers, a so-called cloud, where the neural network 100 is stored, for example, as a program.

In step S16, the neural network 100 then determines, using the image data, whether an image of the object 14 to be classified is present in the image. Subsequently, in step S18, the object 14 is then classified. The classification is performed using the image data and template data which are fed to the neural network 100 along with the image data. This template data is sensor data corresponding to an image of a template object. The template object is associated with at least one object class. This object class may be, for example: a particular type of vehicle, an adult pedestrian, a child, a cyclist, a particular traffic sign, a traffic light, a particular obstacle, or a particular source of danger. The object 14 is classified, during which the neural network 100 decides whether the object 14 belongs to the object class of the template object or not. The result of this decision is then outputted, for example as a true or false response, by the neural network 100.

Steps S16 and S18 may be repeated for a plurality of template data, each corresponding to images of different template objects. These template objects are respectively assigned to different object classes. In this way, it can be decided whether the object 14 is to be assigned to one of these object classes or not. Steps S16 and S18 can be repeated until such time that the object 14 can be assigned to one of the object classes. Alternatively, steps S16 and S18 can be repeated for all template data. The repetition of steps S16 and S18 is described in more detail below with reference to FIG. 5. Lastly, the process is ended in step S20.

The template data used in the present embodiment is first template data, which is to say, template data that has already been used as input in training the neural network 100, and/or second template data, which is to say, template data that has not been used as input in training the neural network 100. The training of the neural network 100 will be described in further detail below in connection with FIG. 4.

Figure 3:
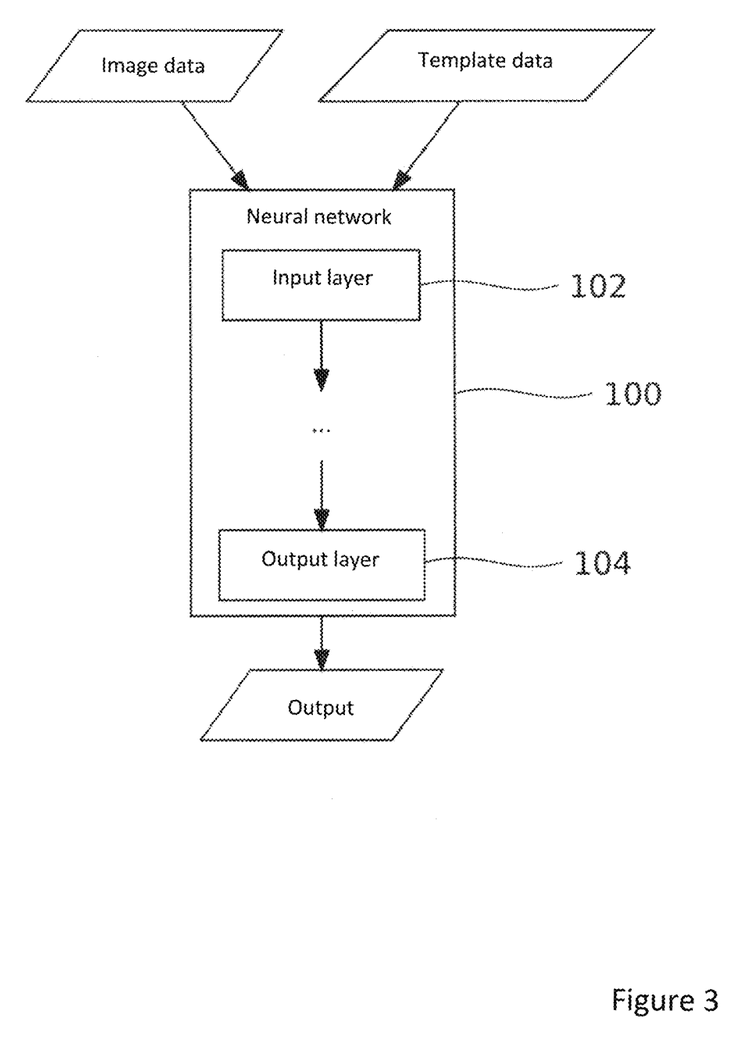
FIG. 3 shows a schematic representation of a neural network.

FIG. 3 shows a schematic representation of the neural network 100 used to determine and classify the object 14 in steps S16 and S18 of FIG. 2. The neural network 100 comprises a plurality of layers, but at least one input layer 102 and one output layer 104.

The image data and the template data are fed as input into the neural network 100. The image data and the template data are then processed by the neural network 100. Finally, the output layer 104 outputs an output. This output consists, in particular, of a Boolean data type constant, which is to say, for example, true or false. The value of the output depends on whether the neural network 100 has assigned the object 14 to which the image data corresponds to the same object class as the template object to which the template data corresponds. The neural network 100 may also be fed with template data as input corresponding to more than one template object. In this case, the output of the network is, for example, a vector with one entry for each template object.

Figure 4:
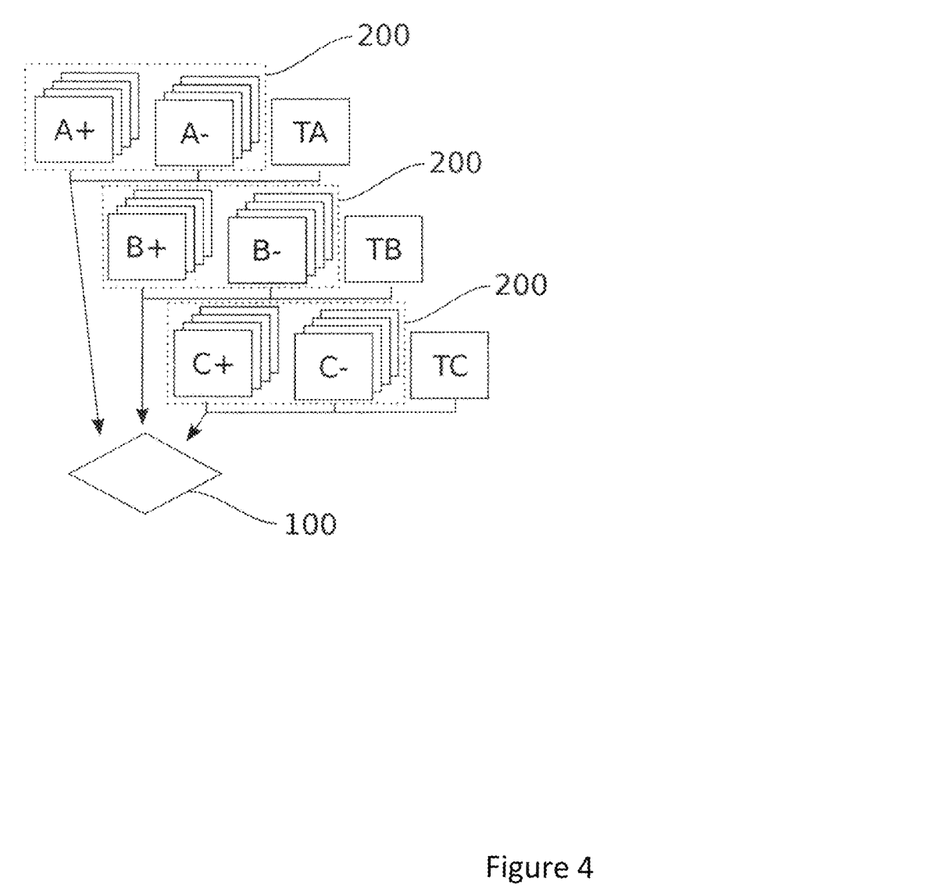
FIG. 4 shows a schematic representation of the training of the neural network.

FIG. 4 shows a schematic representation of the training of the neural network 100. In order to train the neural network 100, training sensor data 200 corresponding to images of further objects 14 are used. Some of the further objects 14 are associated with at least one of the object classes, which is to say, the corresponding images are positive examples of the object class. The remaining further objects 14 are not associated with any of the object classes, which is to say, the corresponding images are negative examples of the object class. FIG. 4 shows positive examples labeled A+, B+, and C+, negative examples labeled A−, B−, and C−, and template data labeled TA, TB, and TC of three different object classes.

The neural network 100 is fed with the positive examples and the negative examples of an object class along with the template data corresponding to the object class. Depending on the output of the neural network 100, parameters of the neural network 100 are changed. Parameters are, in particular, weights and threshold values of artificial neurons of which the layers of the neural network 100 are composed. The parameters of the neural network 100 are changed until a predetermined percentage of inputs to the neural network 100, for example 95% or 99%, results in the output expected by the neural network 100.

Figure 5:
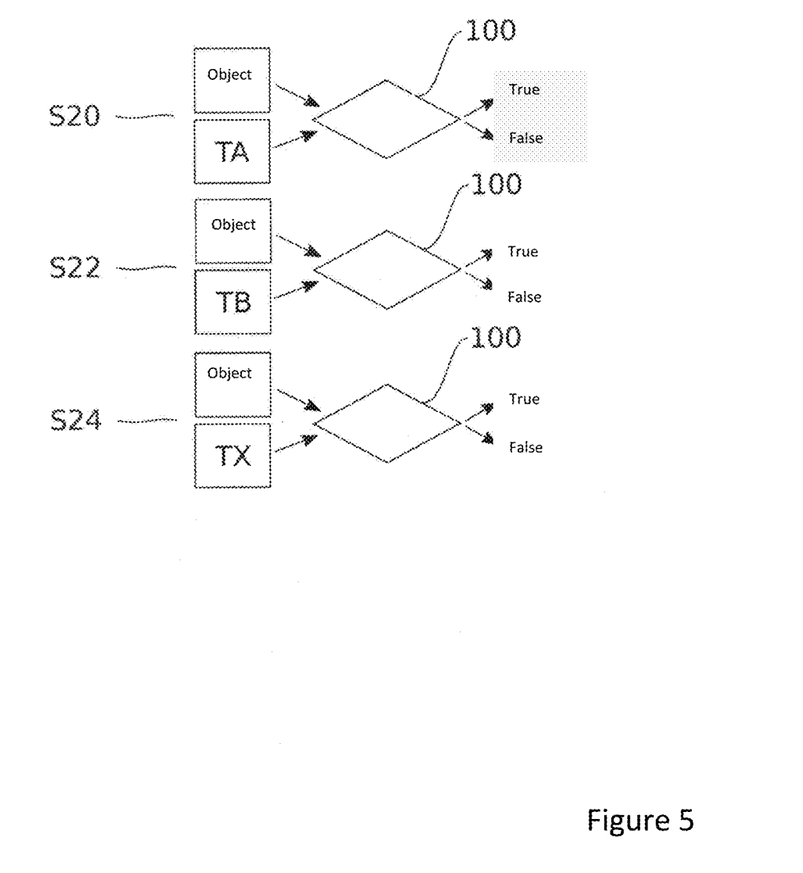
FIG. 5 shows a schematic representation of a procedure for determining and classifying the object using the neural network.

FIG. 5 schematically illustrates a process for determining and classifying the object 14 using the neural network 100 according to one embodiment.

In the first repetition step S20, the image data and first template data TA are fed as input to the neural network 100. Based on the data that has been fed, the neural network 100 decides whether the object 14 to be identified is to be assigned to the object class assigned to the first template data TA. In the second repetition step S22, the image data and further first template data TB corresponding to a further object class are fed as input to the neural network 100. Based on the data that has been fed in step S22, the neural network 100 now decides whether the object 14 to be identified is to be assigned to the further object class assigned to the further first template data TB.

In the third repetition step S24, the image data and second template data TX are fed as input into the neural network 100, which is to say template data with which the neural network 100 has not been trained in the training described with reference to FIG. 4. Since the neural network 100 has been trained to decide whether the object 14 is to be assigned to an object class based on template data, the neural network is also capable of deciding for the second template data TX, whether the object 14 is to be assigned to the object class assigned to the second template data TX.

With reference to FIGS. 1 to 5, the method and the apparatus 12 are described, by way of example, based on one embodiment. In particular, the sensing of the image is carried out by means of a camera 18. Furthermore, in the embodiment shown, the sensing area 16 of this camera 18 is located in front of the vehicle 10. The embodiment of the method shown can correspondingly also be applied using other sensors, in particular, radar and lidar sensors, and/or combinations of said sensors and/or to an area behind the vehicle 10 and/or on the sides of the vehicle 10.

Figure 6:
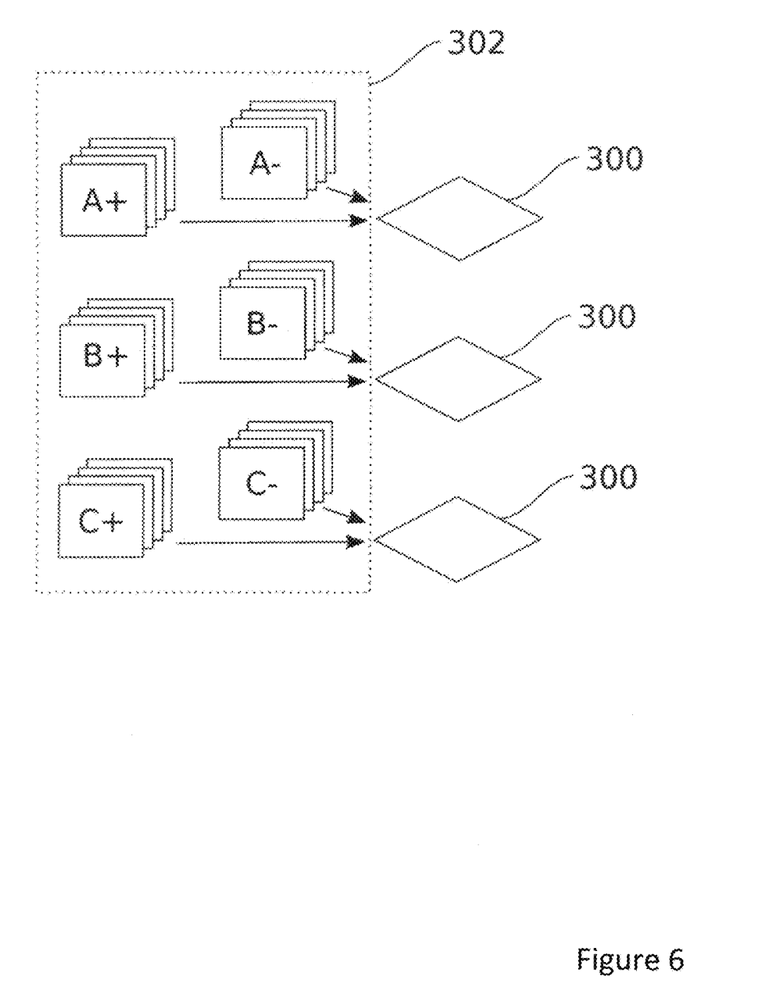
FIG. 6 shows a schematic representation of training of the neural network.

FIG. 6 shows a schematic representation of a training of a neural network 300. Training sensor data 302 which correspond to images of objects are used for training. Some of the objects are associated with at least one object class, which is to say, the corresponding images are positive examples of the object class. The remaining objects are not associated with any of the object classes, which is to say, the corresponding images are negative examples of the object class.

In one training step, the neural network 300 is trained to identify objects of a first object class. For this purpose, the positive examples of the first object class, denoted A+ in FIG. 6, and the negative examples of the first object class, denoted A− in FIG. 6, are fed as input into the neural network 300. Depending on the output of the neural network 300, parameters of the neural network 300 are changed. The training step is repeated for a second object class and a third object class. For this purpose, the positive examples and the negative examples of the two object classes, which are respectively labeled B+ and C+ and B− and C− in FIG. 6, are fed as input into the neural network 300. Depending on the output of the neural network 300, the parameters of the neural network 300 are changed anew. Subsequently, the neural network 300 is trained to identify objects belonging to one of the three object classes.

Figure 7:
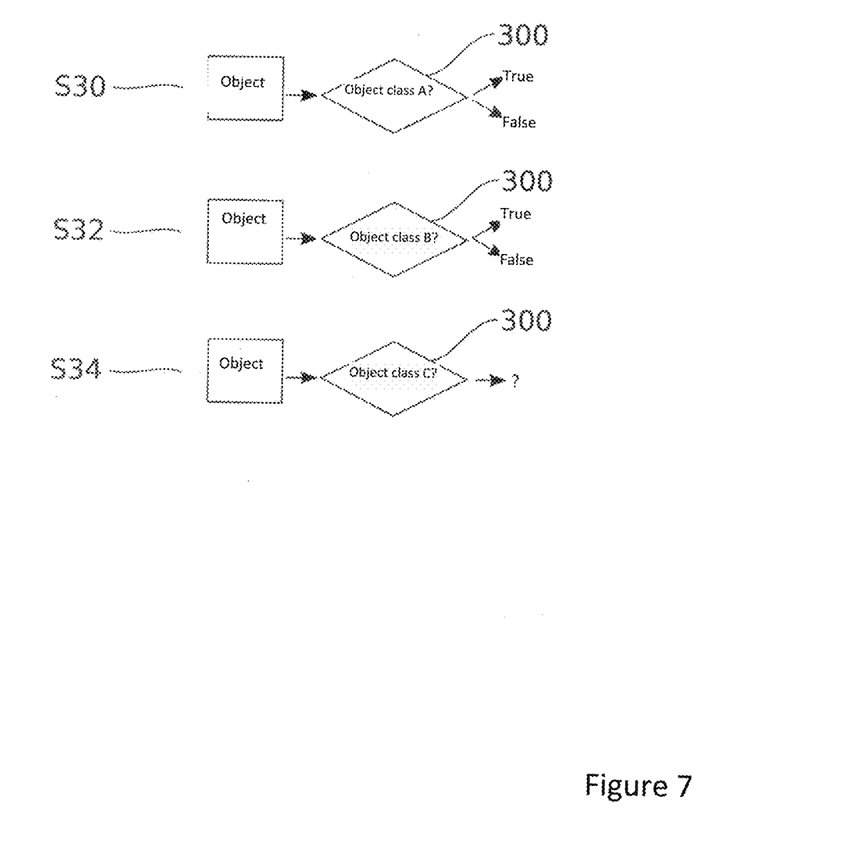
FIG. 7 shows a schematic representation of a procedure for determining and classifying the object.

FIG. 7 schematically illustrates a process for classifying the object using the neural network 300.

In step S30, image data corresponding to an image of the object to be classified is fed into the neural network 300. On the basis of the data that has been fed in as input, the neural network 300 decides whether the object to be identified belongs to the first object class. In the second step S32, the neural network 300 now decides whether the object to be identified belongs to the second object class. In the third step S34, the neural network 300 is to decide whether the object belongs to an object class on the basis of which the neural network 300 was not trained in the training described on the basis of FIG. 6. Since the neural network 300 has only been trained to decide whether the object belongs to one of the three object classes known to it, it cannot make a decision.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining and classifying at least one object in a sensing area of at least one sensor, the method comprising:
    capturing an image of the sensing area using the at least one sensor, wherein the image is a two-dimensional image or a three-dimensional image,
    generating sensor data corresponding to the image, and
    determining the object in the image using the sensor data and first template data of at least one first template object using a neural network,
    wherein the neural network has been trained using the first template data,
    wherein the first template data corresponds to an image of the first template object,
    wherein at least a first object class is assigned to the first template object,
    wherein the object is classified by the neural network determining whether the object is to be assigned to the first object class,
    wherein the object in the image is determined using the sensor data and second template data of a second template object using a neural network,
    wherein the second template data corresponds to an image of the second template object to which at least a second object class is assigned, and
    wherein the object is classified by the neural network determining whether the object is to be assigned to the second object class.

2. The method according to claim 1, wherein the neural network has been trained using the first template data and a plurality of training sensor data, and wherein the training sensor data correspond to images of further objects assigned to at least the first object class.

3. The method according to claim 1, wherein exactly one object class is assigned to each template object.

4. The method according to claim 1, wherein no object class is assigned to more than one template object.

5. The method according to claim 1, further comprising determining an image region which is a subregion of the image and comprises an image of the object using the sensor data and the first template data or the second template data.

6. The method according to claim 1, wherein the at least one sensor is a camera, a lidar sensor, or a radar sensor.

7. The method according to claim 1, wherein the at least one sensor is a sensor of a road vehicle.

8. The method according to claim 7, wherein an object class assigned to the object to be classified is used as input for a driving assistance system or a control unit for autonomous control of the road vehicle.

9. A method for determining and classifying at least one object in a sensing area of at least one sensor, the method comprising:
   capturing an image of the sensing area using the at least one sensor, wherein the image is a two-dimensional image or a three-dimensional image,
   generating sensor data corresponding to the image, and
   determining the object in the image using the sensor data and first template data of at least one first template object using a neural network,
   wherein the neural network has been trained using the first template data,
   wherein the first template data corresponds to an image of the first template object,
   wherein at least a first object class is assigned to the first template object,
   wherein the object is classified by the neural network determining whether the object is to be assigned to the first object class,
   wherein the at least one sensor is a sensor of a road vehicle, and
   wherein a position of the object relative to the road vehicle is determined using the image and an object class assigned to the object to be classified.

10. An apparatus for determining and classifying at least one object in a sensing area, the apparatus comprising:
   a sensor that, in operation, senses an image of the sensing area, wherein the image is a two-dimensional image or a three-dimensional image; and
   an image processing and evaluation unit that, in operation, generates sensor data corresponding to the image, and determines the object in the image using the sensor data and first template data of at least a first template object using a neural network,
   wherein the neural network has been trained using the first template data,
   wherein the first template data corresponds to an image of the first template object,
   wherein at least a first object class is assigned to the first template object,
   wherein the object is classified by the neural network determining whether the object is to be assigned to the first object class,
   wherein the sensor is a sensor of a road vehicle, and
   wherein a position of the object relative to the road vehicle is determined using the image and an object class assigned to the object to be classified.

11. The apparatus according to claim 10, wherein the sensor is a camera, a lidar sensor, or a radar sensor.

12. The apparatus according to claim 10, wherein the sensor is fixedly connected to a road vehicle.

* * * * *